United States Patent
Didinsky et al.

[11] Patent Number: 6,108,594
[45] Date of Patent: Aug. 22, 2000

[54] AUTONOMOUS ATTITUDE ACQUISITION FOR A STELLAR INERTIAL ATTITUDE DETERMINATION SYSTEM

[75] Inventors: Garry Didinsky, Niles, Ill.; Yeong-Wei Wu, Rancho Palos Verdes, Calif.; Rongsheng Li, Hacienda Heights, Calif.; Arunkumar Nayak, Van Nuys, Calif.; Douglas Hein, Los Angeles, Calif.

[73] Assignee: Hughes Electronics Corporation, El Segundo, Calif.

[21] Appl. No.: 09/087,409

[22] Filed: May 29, 1998

[51] Int. Cl.[7] ............................................... G06F 165/00
[52] U.S. Cl. ............................ 701/13; 701/222; 701/226; 244/164
[58] Field of Search .......................... 701/13, 222, 226; 244/171, 164; 342/357.11, 352

[56] References Cited

U.S. PATENT DOCUMENTS

| | | | |
|---|---|---|---|
| 4,617,634 | 10/1986 | Izumida et al. | 701/222 |
| 4,621,329 | 11/1986 | Jacob | 701/222 |
| 4,658,361 | 4/1987 | Kosaka et al. | 701/3 |
| 4,680,716 | 7/1987 | Naudi | 378/44 |
| 4,680,718 | 7/1987 | Sasaki et al. | 701/222 |
| 4,746,976 | 5/1988 | Kamel et al. | 701/222 |
| 4,944,587 | 7/1990 | Harigae | 701/222 |
| 5,109,346 | 4/1992 | Wertz | 701/226 |
| 5,177,686 | 1/1993 | Boinghoff et al. | 701/222 |
| 5,204,818 | 4/1993 | Landecker et al. | 701/226 |
| 5,412,574 | 5/1995 | Bender et al. | 244/164 |
| 5,473,746 | 12/1995 | Pritt et al. | 701/226 |
| 5,508,932 | 4/1996 | Achkar et al. | 701/222 |
| 5,745,869 | 4/1998 | van Bezooijen | 701/222 |
| 5,935,195 | 8/1999 | Quinz | 701/222 |

*Primary Examiner*—Gary Chin
*Attorney, Agent, or Firm*—T. Gudmestad; M. W. Sales

[57] ABSTRACT

A method and apparatus for autonomous acquisition of attitude in a stellar inertial spacecraft attitude system is disclosed. The present invention uses star trackers, an on-board star catalog, spacecraft steering and inertial sensors to determine spacecraft attitude. The present invention utilizes pattern match and pattern rejection methods and uses multiple stellar snap-shots in conjunction with spacecraft steering and spacecraft inertial measurements to acquire spacecraft attitude. Spacecraft inertial measurements are used to connect multiple stellar snap-shots to provide adequate star information that can be used to acquire spacecraft attitude. In an attitude determination system using star trackers, the star trackers may have a narrow field-of-view or few stars may be available for viewing. The present invention uses pattern matching and pattern rejection on different sets of stars, thereby allowing attitude acquisition when the number of stars in view is small.

12 Claims, 7 Drawing Sheets

AUTONOMOUS ATTITUDE ACQUISITION FOR A STELLAR INERTIAL ATTITUDE DETERMINATION SYSTEM

BACKGROUND OF THE INVENTION (a) Field of the Invention

The present invention relates generally to attitude determination systems and, more particularly, to a method and apparatus for autonomous attitude acquisition for a stellar inertial attitude determination system.

(b) Description of Related Art

The term attitude is used to describe the orientation of an object with respect to a reference orientation. Attitude is of particular interest in satellite operations. For example, if a satellite is to be used in a communications application, it is necessary that the satellite be oriented in the proper direction to receive and/or transmit relevant information for the communication link. The attitude of a satellite is determined by computations based on the output of attitude sensors located on the satellite. Attitude sensors monitor the position of reference objects, which may include the sun, the earth, stars and/or star constellations, or radio frequency beacons. For example, a spacecraft may have two or more sensors, one monitoring the sun and one monitoring the earth. However, sun sensors are ineffective when the sun cannot be observed (i.e., when the earth is between the satellite and the sun). Better availability of multiple stars in the sky makes star trackers the preferred attitude measurement devices in many spacecraft applications.

A spacecraft may use two or more star trackers to monitor the position of constellations or stars with respect to the spacecraft. Attitude is determined by comparing information from the star trackers to information in an on-board star catalog (OSC). An OSC includes information such as direction to the stars (right ascension or declination) in the ECI frame and the magnitude of brightness of certain stars. Stars observed by the star trackers that are located in the OSC are commonly referred to as OSC stars. A comparison between where stars are sensed, with respect to the satellite, by the star tracker and the stars in the OSC enables the satellite to determine its attitude.

Comparisons between sensed stars and OSC stars may be made in two different ways: pattern matching and direct matching. When a satellite or spacecraft has no information about its attitude, the spacecraft is "lost in space." When a spacecraft is lost in space, it must acquire its attitude in order to begin its mission. Attitude acquisition is typically performed through pattern matching. To perform pattern matching, the lost spacecraft observes constellations and compares the constellations observed using its star trackers to the stars in the OSC. Various pattern matching methods are disclosed in several U.S. patents. For example, U.S. Pat. Nos. 4,621,329 and 4,944,587 to Jacob and Harigae, respectively, disclose pattern matching methods based on processing a single snap-shot of the sky taken by star trackers. Some pattern matching approaches use a priori information of spacecraft position to reduce the size of the OSC needed. Exemplary systems are disclosed in U.S. Pat. Nos. 4,658,361 and 5,177,686 to Kosaka et al. and Boinghoff et al., respectively.

Once attitude acquisition is performed, spacecraft attitude is basically known within some tolerance. Once this a priori information is known, a direct match procedure may be used to fine-tune and maintain the attitude of the spacecraft. Direct matching uses star trackers to observe stars and examines the observed stars to find a direct match between the observed stars and the OSC stars. When a direct match is found, a reference vector to the star in the ECI frame is calculated and spacecraft attitude is precisely determined.

Star trackers vary in both sensitivity and field-of-view (FOV). Field-of-view is a measure of how broad an area of sky a tracker can monitor. The sensitivity of a star tracker determines how bright a star must be before it can be detected by the tracker. The FOV and sensitivity of a star tracker dictate how many stars that tracker can observe at a given instant in time. To acquire attitude using star trackers and a pattern matching method, at least three OSC stars must be observed at one time. The use of narrow FOV sensors or sensors with reduced sensitivity lowers the probability that sufficient number of OSC stars will be observable by the star trackers. If sufficient OSC stars are not available in the tracker FOV, attitude cannot be acquired using pattern matching.

Disclosed prior systems, which use only a single snapshot of the sky, require a sufficient number of stars in the star tracker FOV in order to acquire spacecraft attitude. Therefore, in many instances, spacecraft attitude may not be acquired due to insufficient OSC stars in the star tracker FOV. Accordingly, there is a need for a star-based attitude acquisition method that provides attitude information when insufficient OSC stars are present in the star tracker field-of-view in a single measurement.

SUMMARY OF THE INVENTION

The present invention is embodied in a method of autonomous determination of spacecraft attitude. The method includes the steps of using a star tracker to observe a first set of stars at a first instant in time, forming a set of candidate star triplets from the first set of stars, and pattern matching each candidate star triplet to an on-board star catalog to determine a set of pattern matches. The method of the present invention further includes the steps of forming a set of candidate spacecraft attitudes based on the pattern matches and performing a rejection method on the set of candidate spacecraft attitudes to eliminate certain candidate spacecraft attitudes from the set of candidate spacecraft attitudes.

In one embodiment, the rejection method includes the steps of using the star tracker to observe a second set of stars at a second instant in time and eliminating certain candidate spacecraft attitudes from the set of candidate spacecraft attitudes if a number of the stars in the observed second set of stars do not match the on-board star catalog.

In another embodiment the rejection method includes the steps of designating each candidate spacecraft attitude with a propagated attitude at an instant in time and the time at which the propagated attitude was measured, computing the difference between a past attitude measurement and a current propagated attitude measurement, and determining a largest string of consistent measurements based on the computed difference. The method further includes the step of terminating the rejection method when the largest string reaches critical length.

The present invention also proposes a method of calibrating an inertial sensor. The method includes the steps of observing a star at a first time, determining if the observed star has been measured previously, retrieving reference measurements if the observed star has been measured previously, and computing a bias estimate based on the observed position of the star and previous measurements of the star.

The present invention is also embodied in a spacecraft including star trackers for observing stars in the sky, inertial sensors for detecting body rates of the spacecraft, and a spacecraft control processor that receives attitude-related position information from the star trackers and the inertial sensors. The spacecraft control processor is programmed to manipulate the star trackers to observe a first set of stars at a first instant in time, form a set of candidate star triplets from the observed stars, and pattern match each candidate star triplet to an on-board star catalog to determine a set of pattern matches. The spacecraft control processor of the present invention is further programmed to form a set of candidate spacecraft attitudes based on the pattern matches and perform a rejection method on the set of candidate spacecraft attitudes to eliminate certain candidate spacecraft attitudes from the set of candidate spacecraft attitudes.

DESCRIPTION OF THE PREFERRED EMBODIMENTS

Figure 1:
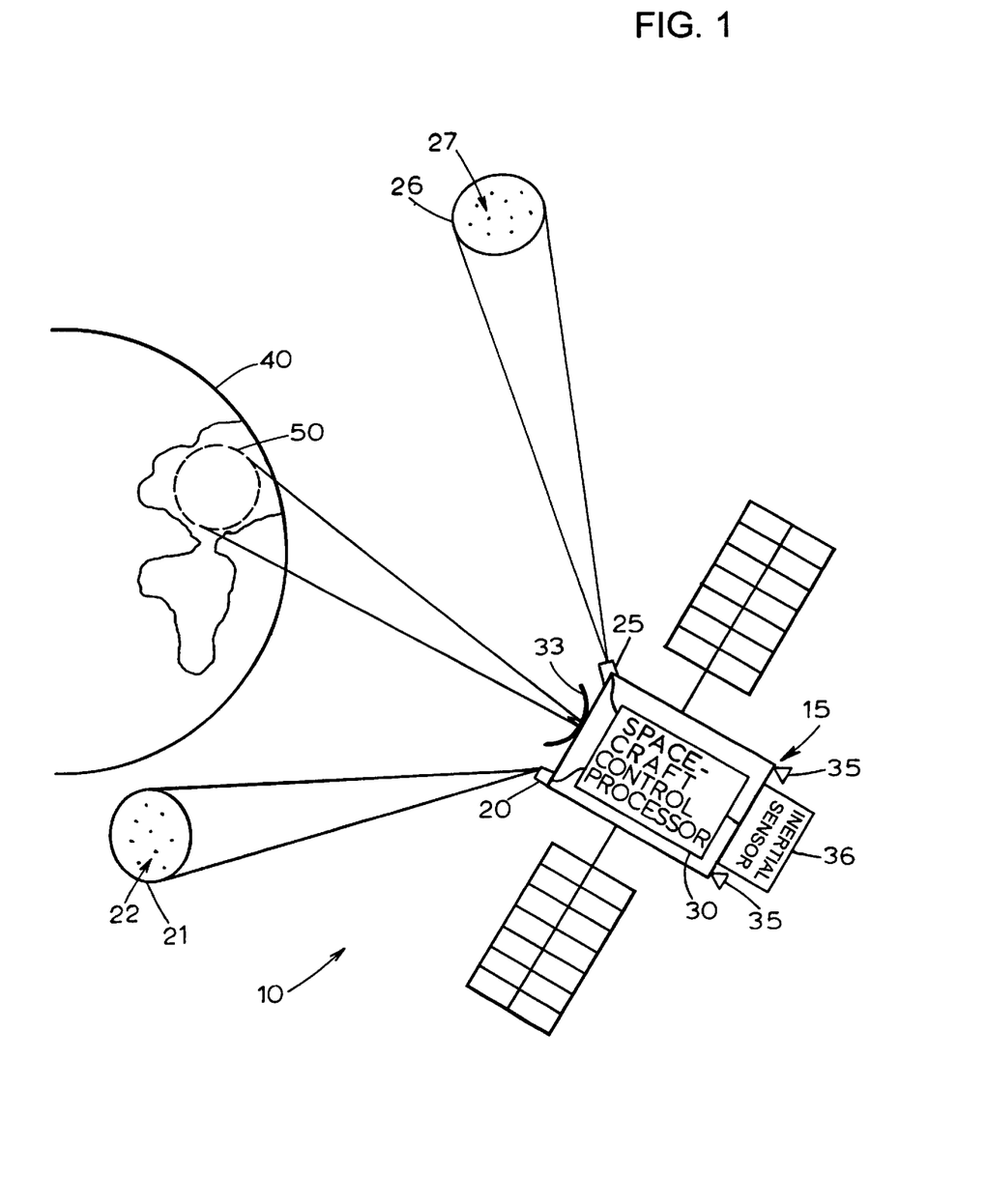
FIG. 1 is an illustration of a satellite system in which the present invention may be implemented.

Referring now to FIG. 1, a satellite system 10 in which the present invention may be implemented is shown. The satellite system 10 includes a satellite 15, which further includes star trackers 20, 25, a spacecraft control processor 30, an antenna 33, thrusters 35, and inertial sensors 36. The star trackers 20, 25 may be embodied in digital cameras based on charge coupled devices (CCDs) The star trackers 20, 25 have fields-of-view 21, 26, which are used to monitor stars and/or celestial constellations 22, 27. The star trackers 20, 25 and are used to determine the attitude of the satellite 15. The outputs from the star trackers 20, 25 are fed to the spacecraft control processor 30, which is responsible for attitude acquisition, determination, and adjustment. Attitude determination may be critical, for example, for a satellite 15 to maintain proper attitude in order to keep the earth footprint 50 of the antenna 33 in a desired location to provide satellite coverage to a particular geographical area 50 on the earth 40.

The satellite 15 also includes inertial sensors 36, which are used to monitor the body rates of the satellite 15. Information from the inertial sensors 36 is used in conjunction with the star trackers 20, 25 to acquire the attitude of the satellite in conjunction with the present invention. The thrusters 35 are used to propel and steer the satellite 15. The steering of the satellite 15 is critical to the attitude acquisition method of the present invention.

Figure 2:
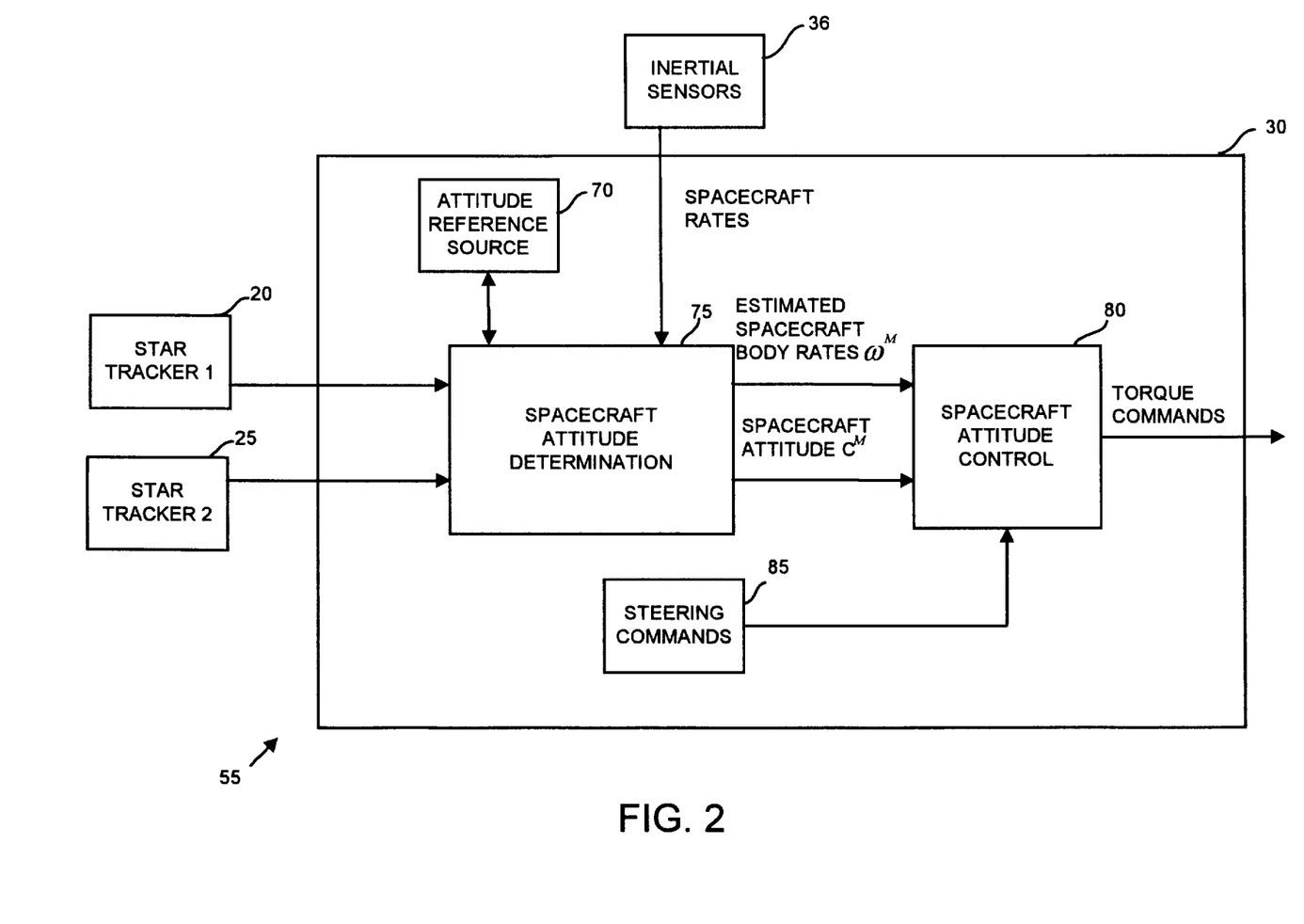
FIG. 2 is a block diagram of the satellite control processor portion of the satellite system shown in FIG. 1.

FIG. 2 is a block diagram of a spacecraft attitude determination and control function 55 embodying the present invention. The spacecraft attitude determination and control function 55 includes the star trackers 20, 25, the inertial sensors 36, and the spacecraft control processor 30. The functions, which will be subsequently described as residing within the spacecraft control processor 30, may be software functions. Alternatively, the functions within the spacecraft control processor 30 may be hardware implementations of the described functions, which reside outside of the spacecraft control processor 30. Hardware implementations of the functions may utilize technology such as application specific integrated circuits (ASICs). The spacecraft control processor includes a attitude reference source 70, a spacecraft attitude determination function 75, a spacecraft attitude control function 80 and a steering command function 85.

The star trackers 20, 25 employed by the present invention are capable of measuring the position of stars or constellations in the star tracker reference frame. The position of two stars may be sufficient to acquire spacecraft attitude. However, three stars is a practical minimum for star pattern identification due to star positions, magnitude uncertainties, and required computational burden. The output of the star trackers 20, 25 is either pixel information representative of the image that is observed by the star tracker or horizontal and vertical information regarding the position of stars in the star tracker FOV. Additionally, star tracker output may include magnitude information based on the the stars observed. The inertial sensors 36 may be gyroscopes or any other mechanisms capable of measuring inertial acceleration and body rates. The sensors 20, 25, and 36 are mounted in a conventional manner to a satellite structure. The star trackers 20, 25 outputs and the inertial sensor outputs are fed to the spacecraft control processor 30 and, more specifically, to the spacecraft attitude determination function 75.

The attitude reference source 70 of the spacecraft control processor 30 may be embodied in an on-board star catalog (OSC), which includes a listing of stars within the sensitivity range of the star tracker and star retrieval functions. The OSC is created on the ground prior to satellite launch. The OSC may include star pattern features that are spacecraft orientation independent, such as star separations. The attitude reference source 70 is in communication with the spacecraft attitude determination function 75.

The spacecraft attitude determination function 75 outputs an estimated spacecraft attitude measurement expressed in terms of a directional cosine matrix $C^m$ and an estimated spacecraft body rate $\omega^m$ to the spacecraft attitude control function 80. The spacecraft attitude control function 80 uses estimated attitude and body rate inputs together with steering commands to generate a set of spacecraft torque commands which are fed to actuators, such as thrusters 35. The thrusters 35 are used to alter the attitude of the spacecraft in response to torque commands. Alternatively, actuators may be embodied in devices such as reaction wheels or magnetic torquers. While the spacecraft attitude control function 80 uses estimated attitude and body rate inputs to correct attitude, the steering command function 85 issues steering commands to alter the desired attitude in a manner consistent with the spacecraft mission. In the case of star acquisition, which is the object of the present invention, the steering command function 85 commands the satellite to various positions to allow the star trackers 20, 25, and the spacecraft control processor 30 to take attitude measurements. The spacecraft attitude control function 80 processes the steering commands, the estimated body rates, and the estimated spacecraft attitude to produce a set of torque commands that are coupled to thrusters or other torque devices.

Figure 3:
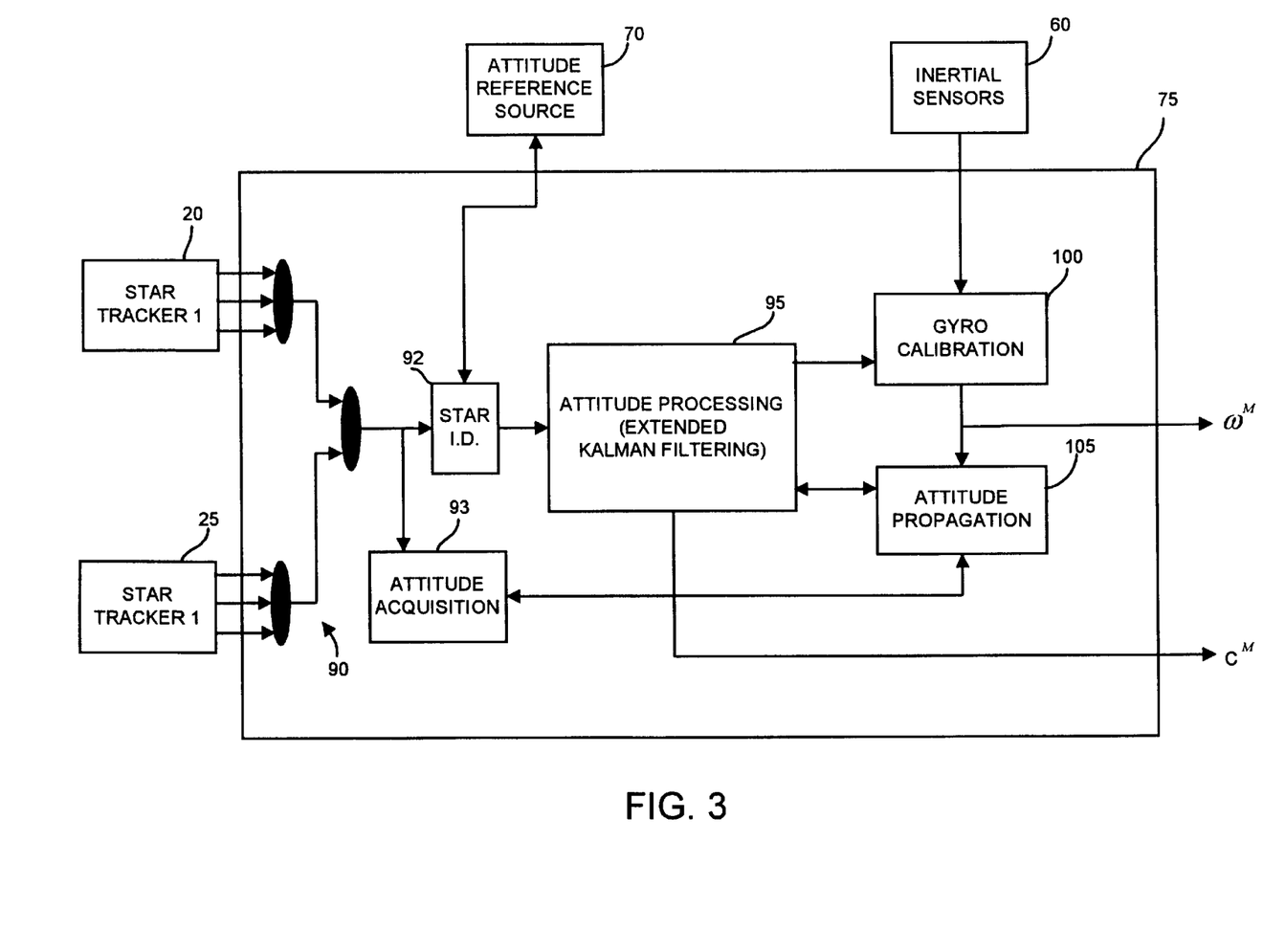
FIG. 3 is a block diagram showing detail of the spacecraft attitude determination function shown in FIG. 2.

FIG. 3 is a software functional block diagram showing further detail of the spacecraft attitude determination function 75 of FIG. 2. The spacecraft attitude determination function 75 includes, star tracker output combining circuitry 90, a star identification function 92, an attitude acquisition function 93, an attitude processing function 95, a gyro calibration function 100, and an attitude propagation function 105.

The star tracker output combining circuitry 90, combines the various outputs of the star trackers 20, 25 into an array of measurements. The array of measurements is coupled to the star identification function 92, which compares the output of the star trackers 20, 25 to the attitude reference source 70. The star identification function 92 performs a dual function in the present invention. While the spacecraft is "lost in space," the star identification function 92 is used to calibrate the inertial sensors 36. However, after attitude is acquired, the star identification function 92 performs the function of direct matching star tracker output to the OSC in the attitude reference source 70.

In accordance with the present invention, the attitude acquisition function 93 is employed when the satellite is "lost in space" and is disabled once satellite attitude is acquired. As will be explained in greater detail in conjunction with FIG. 4, the attitude acquisition function 93 receives a pseudo reference attitude from the attitude propagation function 105 when the satellite has not acquired its attitude. The pseudo reference attitude is any attitude that the attitude propagation function 105 is producing. This attitude is merely used for reference and will be updated at a later time with the proper, acquired attitude. The attitude acquisition function 93 examines the output of the star tracker combining function 90 to determine if sufficient stars are visible and if attitude may be acquired from a first position. If sufficient stars are not available, the satellite steers to a second position where it can observe new stars. The attitude acquisition function 93 correlates the stars observed from the first and second positions with the output from the attitude propagation function 105 to acquire attitude. If, again, sufficient stars are not available, the satellite steers to a third position and correlates the stars observed in all three positions with information from the attitude propagation function 105. In accordance with the present invention, the operation of repeatedly maneuvering the satellite and observing stars while correlating all observed stars using inertial information allows the satellite to acquire its attitude in an efficient manner. After attitude is acquired, the attitude acquisition function 93 transfers the acquired attitude to the attitude propagation function 105, which replaces the pseudo reference attitude with the newly acquired attitude. Once attitude is acquired, the attitude acquisition function 93 is disabled and the attitude processing function 95 performs the function of maintaining satellite attitude through star tracker 220, 25 and inertial sensor 36 information.

The attitude processing function 95 may be embodied in an extended Kalman filtering function. The gyro calibration function 100 processes and calibrates outputs from the inertial sensors 36. This calibration is performed in conjunction with the attitude processing function 95 and the attitude propagation function 105. The attitude propagation function 105, which integrates corrected gyro rates to determine attitude is also in communication with the attitude processing function 95.

Figure 4:
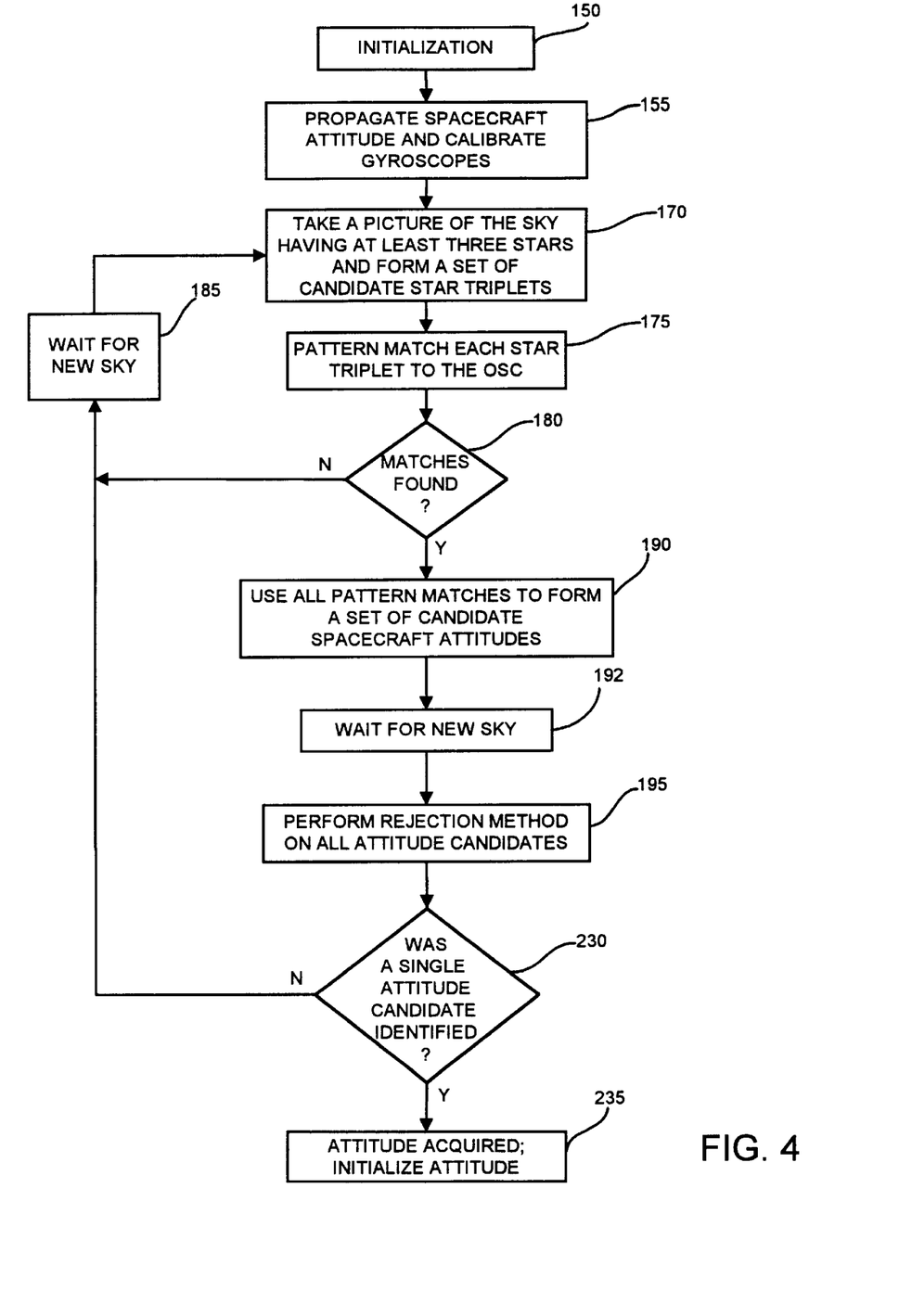
FIG. 4 is a flow chart representation of the functionality of the present invention.

FIG. 4 is a block diagram representation of the functionality that is carried out by the software representing the spacecraft attitude determination function 75 according to the present invention. Generally, the attitude determination function 75 matches star tracker outputs to OSC patterns from the attitude reference source 70 and rejects certain previously matched patterns to acquire satellite attitude. According to the present invention, inertial rate information is used in conjunction with star tracker output to accurately and efficiently acquire satellite attitude. The method of the present invention is executed by the spacecraft attitude determination function 75. The star tracker output combining circuitry 90, the attitude processing function 95, the gyro calibration function 100, and the attitude propagation function 105 of the spacecraft attitude determination function 75 collectively perform the functionality represented in FIG. 4.

Referring again to FIG. 4, a step 150 initializes the method of the present invention. Step 150 begins steering the spacecraft according to the requirements of the spacecraft mission, initializes spacecraft attitude, and initializes a gyroscope calibration method.

Figure 5:
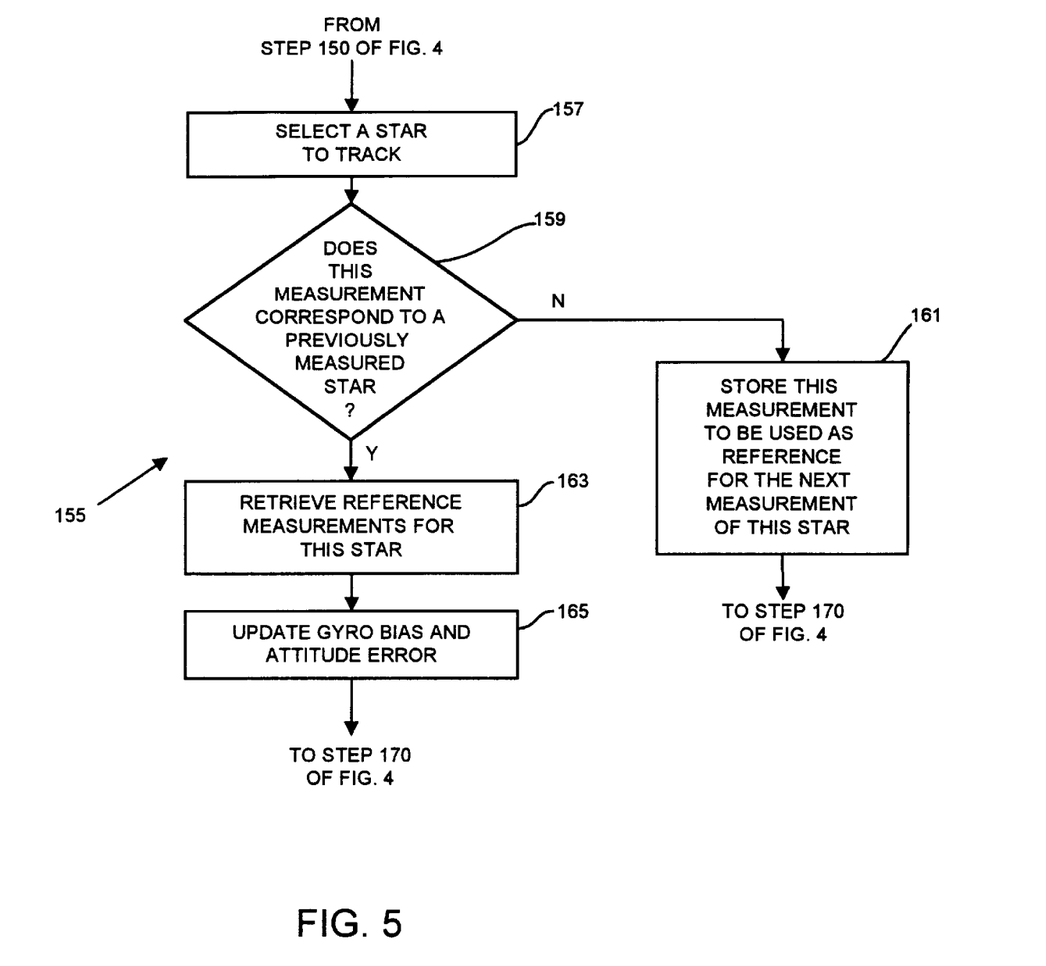
FIG. 5 is a flow chart representation of the calibration method of the present invention.

Step 155 performs the functions of propagating spacecraft attitude based on gyroscope outputs and calibrating the gyroscopes. FIG. 5 is a flow chart representing a method by which gyroscope calibration may be performed. First, step 157 selects a star to track, which is done using the star trackers 20, 25. After a star has been selected, control is passed to step 159. Step 159 determines if the current measurement corresponds to a previously measured star. If the current measurement does not correspond, control is passed to step 161. Step 161 stores the current information for later use as reference for the next measurement of the current star. After step 161 is complete, control passes to step 170 of FIG. 4.

If, however, the current measurement information does correspond to a previously measured star, control is passed from step 159 to step 163. Step 163 retrieves any reference measurements made for the current star that is being measured. The retrieved information is used by step 165 to calculate updates to gyro bias and attitude error. After step 165 calculates the updates, control is returned to step 170 of FIG. 4. The functionality of 155 may be performed by the star identification function 92. Steps 157 to 165 are performed for every star measurement and every attitude update time of the satellite spacecraft control processor 30.

After step 155 of FIG. 4 is complete, control is passed to step 170, which performs the function of manipulating the star trackers 20, 25 to take a picture of the sky, such that the picture has at least three stars present. After the picture is taken, step 170 performs the function of forming a set of candidate star triplets. A star triplet is any three-star combination of stars observed by the star trackers 20, 25. For example, if three stars are present in the picture, there is only one star triple that may be formed. However, if five stars are in the picture, ten star triplets may be formed from the five stars.

After all of the triplets have been formed by step 170, step 175 performs a pattern match by comparing each star triplet to the OSC. This step uses all patterns to form a candidate set of spacecraft attitudes. That is, if matches are found, any match is classified into a candidate set of spacecraft attitudes. After step 175 has completed, step 180 determines if any candidates have been found. If no candidates have been found, control passes to step 185, which waits for new sky to come into the view of the star trackers 20, 25. Because the spacecraft is moving, step 185 effectively widens the FOV of the star trackers. That is, because the spacecraft is being steered, new stars are constantly coming into the view of the star trackers. Therefore, if no matches are found at a particular time, at some later time it is possible that matches will come into view of the star trackers. In an alternative implementation, star observed in different time frames may be combined using gyro-propagated attitude estimates to be processed by the pattern match algorithm.

Figure 6:
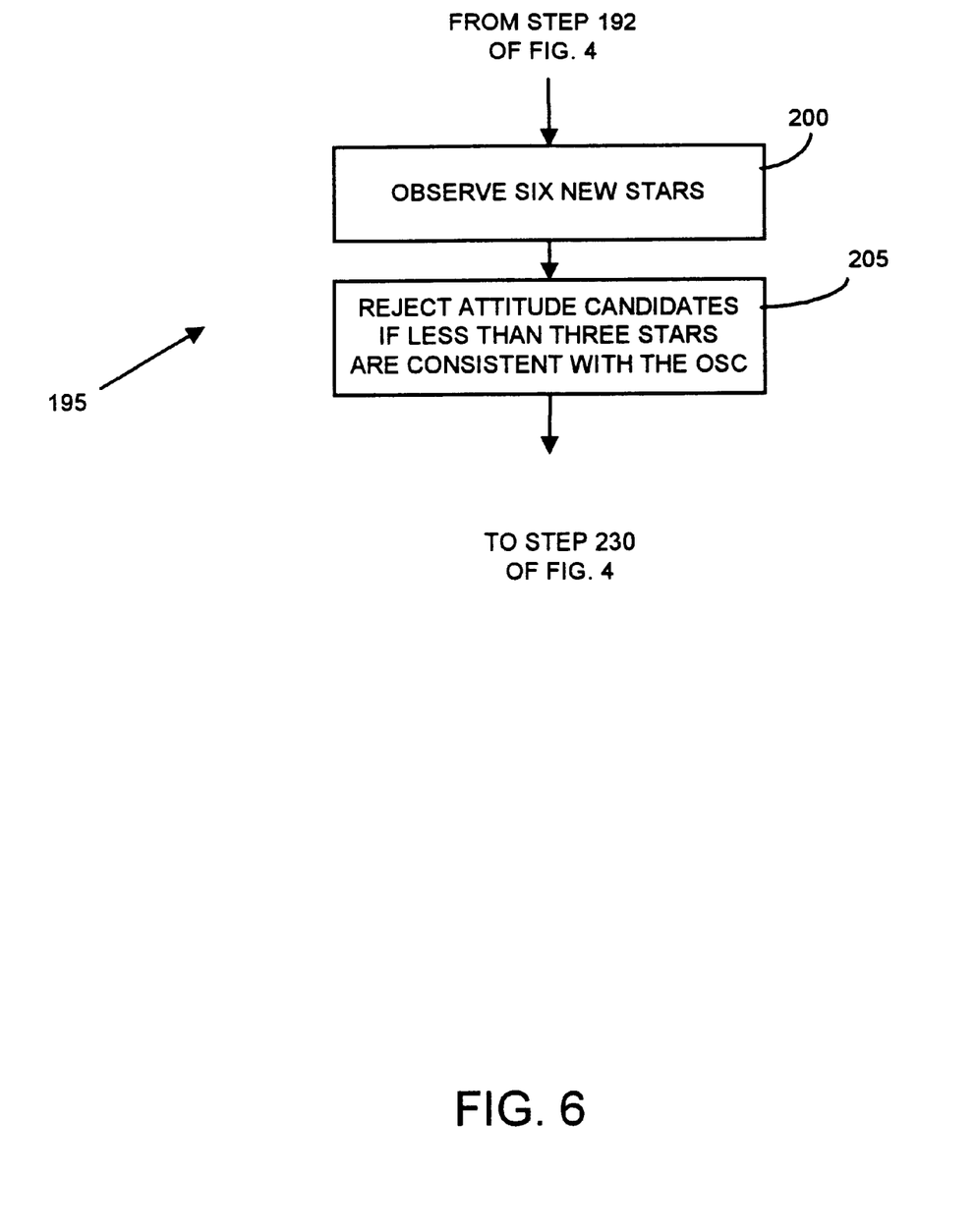
FIG. 6 is a flow chart representation of a rejection method shown in FIG. 4.

If step 180 determines that matches are found, control passes to step 190, which uses all pattern matches to form a set of candidate spacecraft attitudes. After the set of a candidate spacecraft attitudes have been selected, control passes to step 192, which waits for new sky. New sky may be observed through spacecraft steering and reorientation to allow the star trackers 20, 25 to observe new sky. After new sky is available, control passes to step 195, which performs a pattern rejection on the spacecraft candidate attitudes. A flow chart of an exemplary pattern rejection method is shown in FIG. 6. Referring to FIG. 6, step 200 makes star observations until six new stars are observed by the star trackers. Once six new stars are observed, control passes to step 205. Step 205 compares position and magnitude of the newly observed stars to the OSC for each attitude candidate. If less than three stars match the OSC for a given attitude candidate, that candidate is removed from consideration. The functionality of step 205 continues until all attitude candidates are evaluated on the basis of the newly observed stars in comparison to the OSC.

Figure 7:
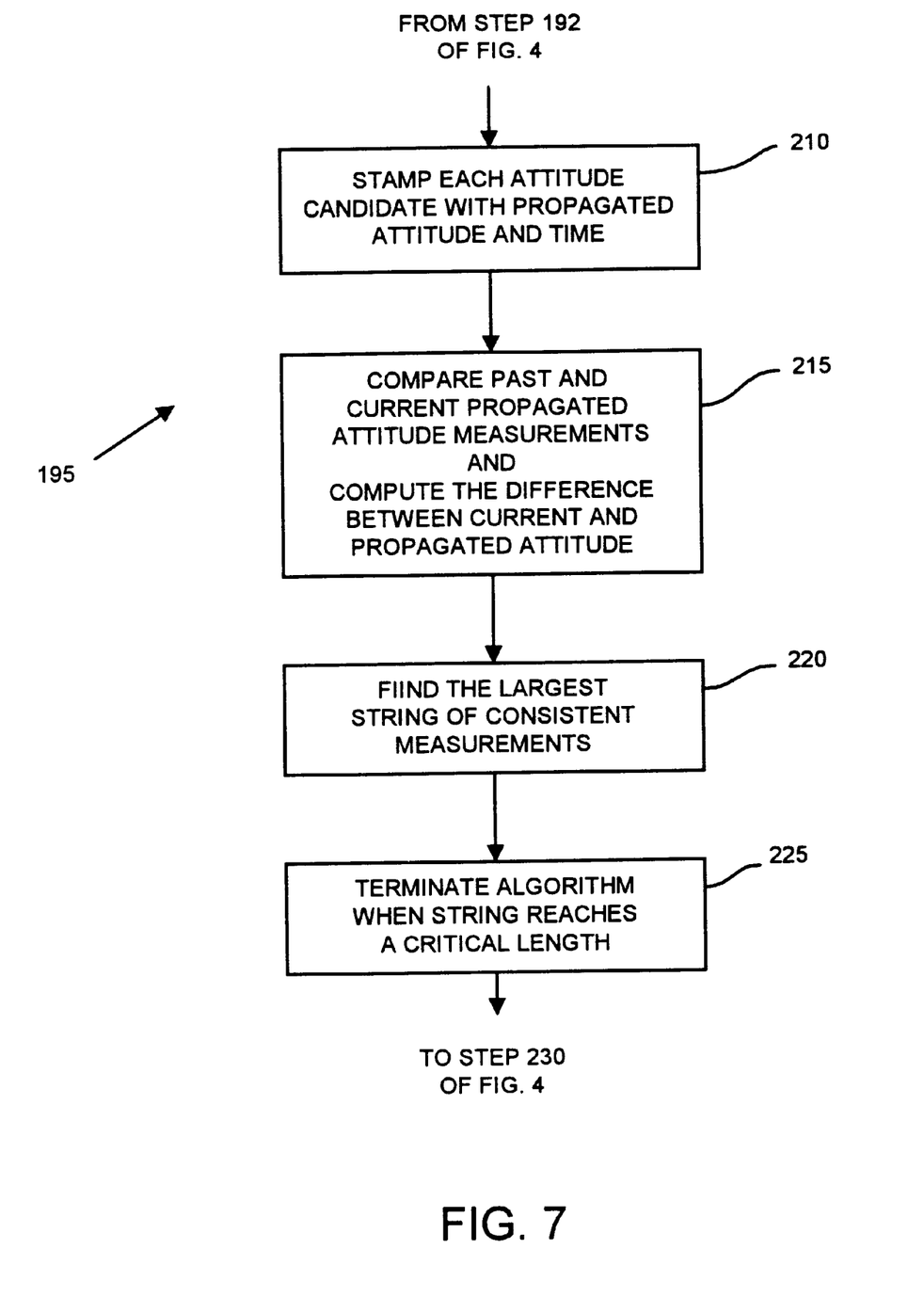
FIG. 7 is an alternative flow chart representation of the rejection method shown in FIG. 4.

FIG. 7 is a flow chart illustrating an alternative pattern rejection method in accordance with the present invention. The method is based on the consistency between gyro propagated attitudes and attitude candidates. The method will be explained in conjunction with Table 1 below.

TABLE 1

|       | $C_1$ | $C_2$ | $C_3$ | $C_4$ |
|-------|-------|-------|-------|-------|
| $C_1$ | —     | C     | I     | I     |
| $C_2$ | —     | —     | C     | I     |
| $C_3$ | —     | —     | —     | I     |
| $C_4$ | —     | —     | —     | —     |

Table 1 is a convenient way to represent the consistency checks that are used in one embodiment of the rejection method. The terms along the top and right side of the table represent four attitude candidates that were produced by step 190 of FIG. 4. Each cell in the top right hand corner of the table is filled with either a C indicating that there is consistency or I indicating that there is inconsistency between the attitude candidates in the corresponding row and column.

Referring again to FIG. 7, step 210 performs the function of stamping each attitude candidate with its propagated attitude and the time at which the attitude was taken. After each attitude candidate has been stamped, step 215 compares all past attitude measurements with the current propagated attitude of each attitude candidate. This comparison includes computing the difference between past attitudes of an attitude candidate and current propagated attitude. All differences should be equal, within a tolerance. The tolerance is a function of time between when attitude candidates were taken and the rate at which the spacecraft move in that time. The comparison is used to determine the consistency of the attitude candidates. Consistency or inconsistency is determined using the matrix equation shown in Equation 1.

$$\|(\hat{C}_1^T \cdot \hat{C}_2)^T (C_1^T \cdot C_2) - I_{3 \times 3}\| < \text{Threshold} \quad \text{Equation 1}$$

In Equation 1, all the directional cosine matrices C represent attitude candidates and all "C hat" terms represent corresponding gyro propagated attitudes. The first parenthetical term represents the difference between the two gyro propagated attitudes. Likewise, the second parenthetical term represents the difference between two attitude candidates. If two candidates are consistent, the multiplication of the transpose of the first parenthetical term with the second parenthetical term will yield a small result. The identity matrix of Equation 1 represents no attitude rotation. Therefore, when the parenthetical terms are combined as shown in Equation 1 and the identity matrix is subtracted from the product, the normalized result will be below a selected threshold if the attitude candidates correlate. The threshold is chosen based on the application of the method of the present invention. Equation 1 represents an equation that would be used to check the correlation between the first and the second attitude candidates. Appropriate modifications to the subscripts may be made to check the correlation of other attitude candidates. Computations using equations similar to Equation 1 are made for each attitude candidate and the corresponding results (C or I) are filled into Table 1. Once Table 1 is filled, control is passed to step 220.

Step 220 finds the largest string of consistent measurements with respect to attitude candidates. For example, as shown in Table 1 attitude candidate 1 ($C_1$) has the longest string of consistent measurements. Step 225 performs the function of evaluating the number of consistent measurements to determine when the rejection algorithm has either rejected all of the candidates or converged on a single candidate. Again, referring to Table 1 attitude candidate $C_1$ would be accepted and all other attitude candidates would be rejected.

Returning to FIG. 4, after the pattern rejection is complete, step 230 tests to see if a single attitude measurement has been identified. If a single measurement has not been identified, control passes back to step 185, which waits for new sky and further passes control to step 170 to start the attitude acquisition process again. If a single attitude measurement is identified by step 230, control is passed to step 235, which indicates that the attitude of the spacecraft has been acquired. At this time the spacecraft will go into normal mode processing phase. That is, normal mode steering and normal mode star identification will be employed in place of acquisition mode functions.

Of course, it should be understood that a range of changes and modifications can be made to the preferred embodiment described above. For example, spacecraft rate propagated by a spacecraft dynamics model may be used instead of the gyros to propagate spacecraft attitude. The star pattern algorithm may be embodied in many possible algorithms, which include algorithms that use three stars for pattern match or any other number of stars, and have arbitrary memory storage formats and contents. A direct pattern match algorithm can be one of many possible algorithms, which include a scheme where an attitude candidate is rejected or accepted after comparison to new or previously sampled stars or attitude candidates. Additionally, the gyroscope compensation method can be one of many possible methods, which use star measurements and their corresponding reference vectors to compute adjustments to the gyroscope outputs. It is therefore intended that the foregoing detailed description be regarded as illustrative rather than limiting and that it be understood that it is the following claims, including all equivalents, which are intended to define the scope of this invention.

What is claimed is:

1. A method of autonomous acquisition of spacecraft attitude comprising the steps of:

using a star tracker to observe a first set of stars at a first instant in time;

forming a set of candidate star triplets from the first set of stars;

pattern matching each candidate star triplet to an on-board star catalog to determine a set of pattern matches;

forming a set having a plurality of spacecraft attitudes based on the pattern matches; and performing a rejection method on the set of spacecraft attitudes to eliminate certain spacecraft attitudes from the set of spacecraft attitudes.

2. The method of claim 1, wherein the step of performing a rejection method comprises the steps of:

using the star tracker to observe a second set of stars; and eliminating certain spacecraft attitudes from the set of spacecraft attitudes when a number of the stars in the observed second set of stars do not match the on-board star catalog.

3. The method of claim 1, wherein the step of performing a rejection method comprises the steps of:

designating each spacecraft attitude with a propagated attitude at an instant in time and the time at which the propagated attitude was measured;

computing a difference between a past attitude measurement and the propagated attitude;

comparing the difference to a threshold;

filling a table with consistent or inconsistent in response to the step of comparing;

determining a largest string of consistent attitude measurements from the table; and repeating the steps of designating, comparing, filling and determining while the largest string is below a critical length.

4. The method of claim 1, further comprising the step of calibrating an inertial sensor.

5. The method of claim 4, wherein the steps of calibrating an inertial sensor comprises the steps of:

observing a star at a first time;

determining when the observed star has been measured previously;

retrieving reference measurements if the observed star has been measured previously; and computing a bias estimate based on the observed position of the star and the previous measurements of the star.

6. The method of claim 4, wherein the inertial sensor comprises a gryoscope.

7. A spacecraft comprising:

a star tracker for observing stars in the sky;

an inertial sensor for detecting body rates of the spacecraft; and an on-board star catalog which contains information on star position and brightness;

a spacecraft control processor that receives attitude-related position information from the star tracker and the inertial sensor;

said spacecraft control processor programmed to:

manipulate the star tracker to observe a first set of stars at a first instant in time;

form a set of candidate star triplets from the first set of stars;

pattern match each candidate star triplet to the on-board star catalog to determine a set of pattern matches;

form a set having a plurality of spacecraft attitudes based on the pattern matches; and perform a rejection method on the set of spacecraft attitudes to eliminate certain spacecraft attitudes from the set of spacecraft attitudes.

8. The apparatus of claim 7, wherein the rejection method comprises the steps of:

using the star tracker to observe a second set of stars at a second instant in time; and eliminating certain spacecraft attitudes from the set of spacecraft attitudes when a number of the stars in the observed second set of stars do not match the on-board star catalog.

9. The apparatus of claim 7, wherein the rejection method comprises the steps of:

designating each spacecraft attitude with a propagated attitude at an instant in time and the time at which the propagated attitude was measured;

computing a difference between a past attitude measurement and the propagated attitude;

comparing the difference to a threshold;

filling a table with consistent or inconsistent in response to the step of comparing;

determining a largest string of consistent attitude measurements from the table; and repeating the steps of designating, comparing, filling and determining while the largest string is below a critical length.

10. The apparatus of claim 7, wherein the spacecraft control processor is further programmed to calibrate the inertial sensor.

11. The apparatus of claim 10, wherein said calibrating of the inertial sensor comprises the steps of:

observing a star at a first time;

determining when the observed star has been measured previously;

retrieving reference measurements if the observed star has been measured previously; and computing a bias estimate based on the observed position of the star and the previous measurements of the star.

12. The apparatus of claim 7, wherein the inertial sensor comprises a gryoscope.

* * * * *